US009000707B2

(12) United States Patent
Arefeen et al.

(10) Patent No.: US 9,000,707 B2
(45) Date of Patent: Apr. 7, 2015

(54) USE OF COOLING FAN IN ADJUSTABLE SPEED DRIVES

(71) Applicant: Toshiba International Corporation, Houston, TX (US)

(72) Inventors: Mohammed Arefeen, Houston, TX (US); Mark Rayner, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 199 days.

(21) Appl. No.: 13/652,695

(22) Filed: Oct. 16, 2012

(65) Prior Publication Data

US 2014/0103851 A1    Apr. 17, 2014

(51) Int. Cl.
*H02P 3/24*      (2006.01)
*H02P 11/04*     (2006.01)
*H02M 7/5387*    (2007.01)
*H02M 1/32*      (2007.01)
*H02P 27/08*     (2006.01)

(52) U.S. Cl.
CPC ...... *H02M 7/5387* (2013.01); *H02M 2001/327* (2013.01); *H02P 27/08* (2013.01)

(58) Field of Classification Search
CPC ............ G06F 1/26; G06F 1/324; H02M 1/08; G01K 7/24; G01R 27/02; G05D 23/2413; H01L 29/0619; H01L 29/86; H01M 10/48; H02J 7/345; Y02B 60/1217
USPC .......... 318/504, 139, 519; 363/157, 132, 129, 363/123; 361/16
See application file for complete search history.

(56) References Cited

U.S. PATENT DOCUMENTS

| | | | |
|---|---|---|---|
| 5,627,742 A | 5/1997 | Nakata et al. | |
| 6,031,738 A * | 2/2000 | Lipo et al. | 363/37 |
| 6,137,704 A * | 10/2000 | Ito et al. | 363/132 |
| 6,842,354 B1 | 1/2005 | Tallam et al. | |
| 7,050,311 B2 * | 5/2006 | Lai et al. | 363/37 |
| 7,215,559 B2 * | 5/2007 | Nondahl et al. | 363/37 |
| 7,459,038 B1 * | 12/2008 | Watson | 148/651 |
| 7,965,069 B2 * | 6/2011 | Watanabe et al. | 323/284 |
| 8,368,344 B2 * | 2/2013 | Yoo et al. | 318/812 |
| 8,415,904 B2 * | 4/2013 | Rippel | 318/139 |

(Continued)

FOREIGN PATENT DOCUMENTS

| | | | |
|---|---|---|---|
| JP | H07135782 A | 5/1995 | |
| JP | 2011139593 | * 7/2011 | ............. H20P 27/06 |
| JP | 2011139593 A | 7/2011 | |

OTHER PUBLICATIONS

International Search Report and Written Opinion in PCT/US2013/065183 mailed Aug. 4, 2014.

*Primary Examiner* — Rita Leykin
(74) *Attorney, Agent, or Firm* — Banner & Witcoff, Ltd.

(57) ABSTRACT

Apparatuses and methods are described for implementing adjustable speed drives. For instance, an apparatus may comprise an inverter circuit configured to drive a multi-phase electrical load, the inverter configured to be powered by first and second direct-current (DC) bus lines, a fan drive circuit configured to be powered by the first and second DC bus lines, a fan configured to be controlled by the fan drive circuit and having a plurality of windings coupled together at an electrical node, a first capacitor having a first terminal coupled to the first DC bus line and a second terminal coupled to the electrical node, and a second capacitor having a first terminal coupled to the second DC bus lines and a second terminal coupled to the electrical node.

20 Claims, 4 Drawing Sheets

(56) References Cited

U.S. PATENT DOCUMENTS

| | | |
|---|---|---|
| 8,508,165 B2* | 8/2013 | Shinomoto et al. ........ 318/400.3 |
| 2007/0211501 A1* | 9/2007 | Zargari et al. ................... 363/39 |
| 2008/0080212 A1 | 4/2008 | Grbovic |
| 2008/0238383 A1* | 10/2008 | Watanabe et al. ............. 323/271 |
| 2008/0298103 A1* | 12/2008 | Bendre et al. ................... 363/89 |
| 2014/0132190 A1* | 5/2014 | Kitano ..................... 318/400.22 |

* cited by examiner

USE OF COOLING FAN IN ADJUSTABLE SPEED DRIVES

BACKGROUND

Adjustable speed drives are commonly used to drive electrical loads such as electric motors, pumps, and other cyclical equipment. Such drives typically include an inverter that converts power supplied by a main DC power bus to multi-phase current as appropriate for the load being driven. Adjustable speed drives also typically include a capacitor-resistor network designed to absorb variations in the main DC power bus and to discharge excess power such as during shut down of the drive. The resistors in the capacitor-resistor network are also typically used as a voltage divider (a passive voltage balancing system) to attempt to balance the DC voltage across the capacitors.

The capacitors in the capacitor-resistor network, like all capacitors, are prone to deterioration with time and usage. Deterioration during normal operation is generally gradual and uneven between the various capacitors, and so it may be expected that the passive voltage balancing system will slowly drift away from optimal performance. Deterioration may be greatly accelerated by an over-temperature, over-current, or over-voltage environment, potentially causing premature and unexpected failure of the capacitors. The failure of one of the capacitors in the network may trigger the failure of another of the capacitors due to the sudden over-voltages that may be experienced. This could potentially cause damage to the drive and/or to the load, and/or it may trigger a power fuse to open. It is therefore desirable to maintain the integrity of the capacitors for proper and safe operation of the adjustable speed drive.

SUMMARY

Aspects are disclosed herein that are directed to actively balancing the main DC bus voltages in a variable speed drive using a variable speed cooling fan drive circuit. Cooling fans are typically included in such drives and are typically run at a fixed speed. The cooling fan may be driven by a variable-speed fan drive circuit, such as an H-bridge converter or a fan inverter, that actively bleeds off power from a main inverter circuit to appropriate balance the main DC bus lines. The fan drive circuit may further allow the fan to operate at variable speeds to provide extra air flow when needed. The center point of the fan windings may be coupled to the center point of a main DC bus capacitor network. This creates a virtual ground that may be used for proper operation of the fan motor.

According to further aspects, the capacitor network may be used while potentially eliminating the voltage-divider resistor network that traditionally balances the main DC bus lines in a passive manner. This may instead be replaced with active balancing provided by the fan drive circuit that may be used to exercise control over the voltage of the virtual ground center point to balance the main DC bus lines.

According to further aspects, the fan itself may be used for discharging excess power, rather than the traditional resistor network. This may be more desirable, as the excess power may be used toward cooling rather than toward generating heat. Moreover, the potential for elimination of the discharge resistors may reduce the number of power circuit elements (and thus the cost) of the adjustable speed drive.

According to further aspects, apparatuses and methods are described for implementing adjustable speed drives. For instance, an apparatus may comprise an inverter circuit configured to drive a multi-phase electrical load, the inverter configured to be powered by first and second direct-current (DC) bus lines. The apparatus may further comprise a fan drive circuit configured to be powered by the first and second DC bus lines, and a fan configured to be controlled by the fan drive circuit and having a plurality of windings coupled together at an electrical node. The apparatus may further comprise a first capacitor having a first terminal coupled to the first DC bus line and a second terminal coupled to the electrical node, and a second capacitor having a first terminal coupled to the second DC bus lines and a second terminal coupled to the electrical node.

As another example, an apparatus may comprise a plurality of insulated gate bipolar transistors (IGBTs) each having a collector/emitter path electrically extending between first and second electrical nodes. The apparatus may further comprise a fan configured to be controlled by the plurality of IGBTs and having a plurality of windings electrically coupled together at a third electrical node, a first capacitor having a first terminal coupled to the first electrical node and a second terminal coupled to the third electrical node, and a second capacitor having a first terminal coupled to the second electrical node and a second terminal coupled to the third electrical node. The apparatus may further comprise a controller configured to control the IGBTs based on a first voltage between the first and third electrical nodes and based on a second voltage between the second and third electrical nodes.

As yet another example, the apparatus may comprise an inverter circuit configured to drive a multi-phase electrical load, the inverter configured to be powered by first and second direct-current (DC) bus lines, a fan drive circuit configured to be powered by the first and second DC bus lines, and a fan configured to be controlled by the fan drive circuit and having a plurality of windings coupled together at an electrical node. The apparatus may further comprise a controller configured to selectively control the fan drive circuit based upon a measured voltage of the electrical node relative to the first and second DC bus lines.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

In the following description of various illustrative embodiments, reference is made to the accompanying drawings, which form a part hereof, and in which is shown by way of illustration various examples in which aspects of the disclosure may be practiced. It is to be understood that many other examples may be utilized, and many other structural and functional modifications may be made, without departing from the scope of the present disclosure.

Figure 1:
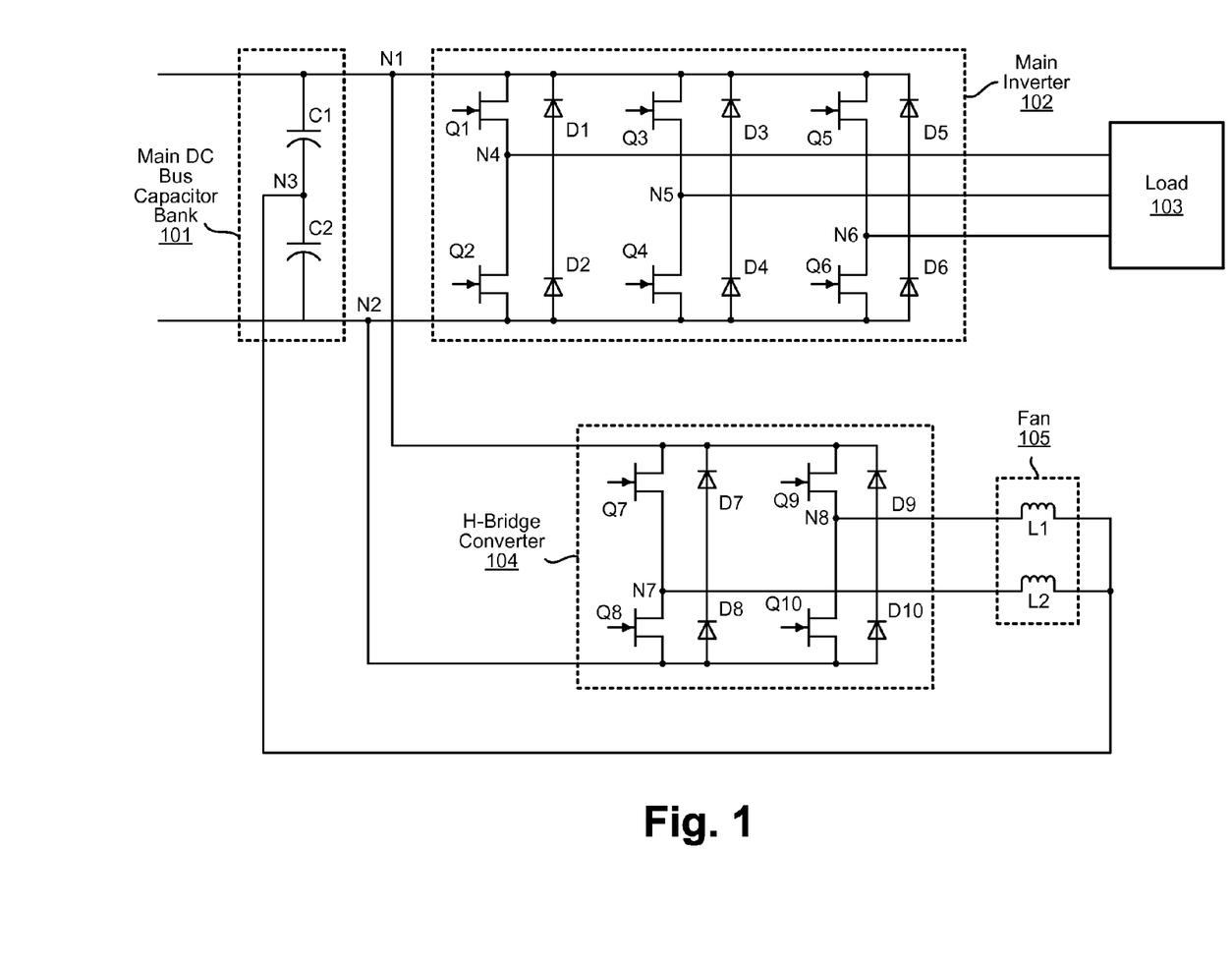
FIG. 1 is a schematic diagram of an example adjustable speed drive system having a single-phase cooling fan, in accordance with aspects as described herein.

FIG. 1 is a schematic diagram of an example adjustable speed drive system having a single-phase cooling fan 105. The system may further have a main direct current (DC) bus capacitor bank 101, a main inverter 102, and a fan drive circuit such as an H-bridge converter 104. The system may drive a load 103.

The main inverter 102 may be any type of appropriate inverter for the load 103. In the present example, the main inverter 102 includes six switches Q1-Q6 and six diodes D1-D6 arranged as shown in FIG. 1. In this example, the switches Q1-Q6 are in the form of six insulated gate bipolar transistors (IGBTs). However, the switches Q1-Q6 may be other types of switches, such as other types of transistors. The switches Q1-Q6 will be referred to herein by way of example as IGBTs Q1-Q6. The IGBTs Q1-Q6 may be arranged, for example, such that the collector/emitter current paths of IGBTs Q1 and Q2 are arranged in series with each other, the collector/emitter current paths of IGBTs Q3 and Q4 are arranged in series with each other, and the collector/emitter current paths of IGBTs Q5 and Q6 are arranged in series with each other. Each of the IGBTs Q1-Q6 may be driven at their gates by driving signals in such as in a well-known manner, to synchronize the currents passing through the respective IGBTs Q1-Q6. The driving signals may be, for example, pulse-width modulated (PWM) signals, where the timing and width of the pulses for each of the IGBTs Q1-Q6 may be orchestrated so as to provide a desired one or more phases of drive current to the load 103. While a particular quantity of switches and diodes are shown in the main inverter 102 of FIG. 1, there may be fewer or greater numbers of switches and diodes, as desired, and as appropriate for driving the load 103.

The main inverter 102 may be coupled at nodes N1 and N2 to the main DC bus capacitor bank 101. The main DC bus capacitor bank 101 may include capacitors C1 and C2 in series, with a floating electrical node N3 between the capacitors C1 and C2, and with electrical nodes N1 and N2 at the opposite ends of the series capacitors C1, C2. Thus, the capacitor C1 may have terminals coupled to nodes N1 and N3, and the capacitor C2 may have terminals coupled to nodes N2 and N3. Additional capacitors and/or other circuit elements may also be used, if desired.

The load 103 is a three-phase load in the example of FIG. 1. However, the load 103 may be of any number of phases. The load 103 may be any type of load that may provide resistive, capacitive, and/or inductive load components. The load 103 may be driven, in this example, at three electrical nodes N4, N5, and N6 as shown, each disposed between a different respective pair of the IGBTs Q1-Q6.

The H-bridge converter 104 may also be coupled to nodes N1 and N2, and may include a number of switches and diodes. In the present example, the H-bridge converter 104 includes four switches Q7-Q10 and four diodes D7-D10 arranged as shown in FIG. 1. In this example, the switches Q7-Q10 are in the form of four insulated gate bipolar transistors (IGBTs). However, the switches Q7-Q10 may be other types of switches, such as other types of power transistors. The switches Q7-Q10 will be referred to herein by way of example as IGBTs Q7-Q10. The IGBTs Q7-Q10 may be arranged, for example, such that the collector/emitter current paths of IGBTs Q7 and Q8 are arranged in series with each other, and such that the collector/emitter current paths of IGBTs Q9 and Q10 are arranged in series with each other. Each of the IGBTs Q7-Q10 may be driven at their gates by driving signals to synchronize the currents passing through the respective IGBTs Q7-Q10. The driving signals may be, for example, PWM signals, where the timing and width of the pulses for each of the IGBTs Q7-Q10 may be orchestrated so as to provide a desired one or more phases of drive current to the fan 105. While a particular number of switches and diodes are shown in the H-bridge converter 104 of FIG. 1, there may be fewer or greater numbers of switches and diodes, as desired, and as appropriate for driving the fan 105.

The fan 105 is a single-phase electrical fan in the example of FIG. 1. However, the fan 105 may be a fan of any number of electrical phases. The fan 105 may include two or more inductive motor coils. In this example, the fan 105 includes motor coils L1 and L2. The fan 105 may be driven, in this example, at two electrical nodes N7 and N8 as shown, each disposed between a different respective pair of the IGBTs Q7-Q10, and each coupled to a different one of the motor coils L1 and L2. The other ends of the motor coils L1 and L2 may be coupled to node N3 of the main DC bus capacitor bank 101. The fan 105 may be configured to as to provide cooling (such as by blowing air or liquid across) one or more elements of the load driver 301. In particular, it may be desirable to provide cooling to the capacitors C1, C2 and/or to the various IGBTs.

As will described further, the feedback of the windings of fan 105 into floating node N3 may allow the voltage at node N3 relative to the voltages at N1 and/or N2 to be used as a basis for controlling the fan 105 so as to perform load balancing by maintaining stability of the voltages at nodes N1, N2, and/or N3. As opposed to a traditional fixed voltage-divider resistor network for controlling the voltage between nodes N1 and N2, the fan 105 itself may be actively controlled to regulate the floating ground voltage at node N3 at or near a target voltage, such as at a center point between the voltages of N1 and N2. To regulate the voltage at node N3, the fan 105 may be selectively controlled so as to cause the drive currents at the various windings of the fan 105 to be out of balance by an appropriate amount as needed. This may, for example, allow for some of the energy in the main inverter 102 to be dissipated through the fan 105 on an as-needed basis, without the need for the voltage divider resistors traditionally used for voltage dissipation and control. Thus, the fan 105 may now be selectively used as an energy dissipation element for both load balancing and shutdown purposes. This may also potentially eliminate the need for the run capacitor that has been traditionally used on one of the windings of a cooling fan.

Figure 2:
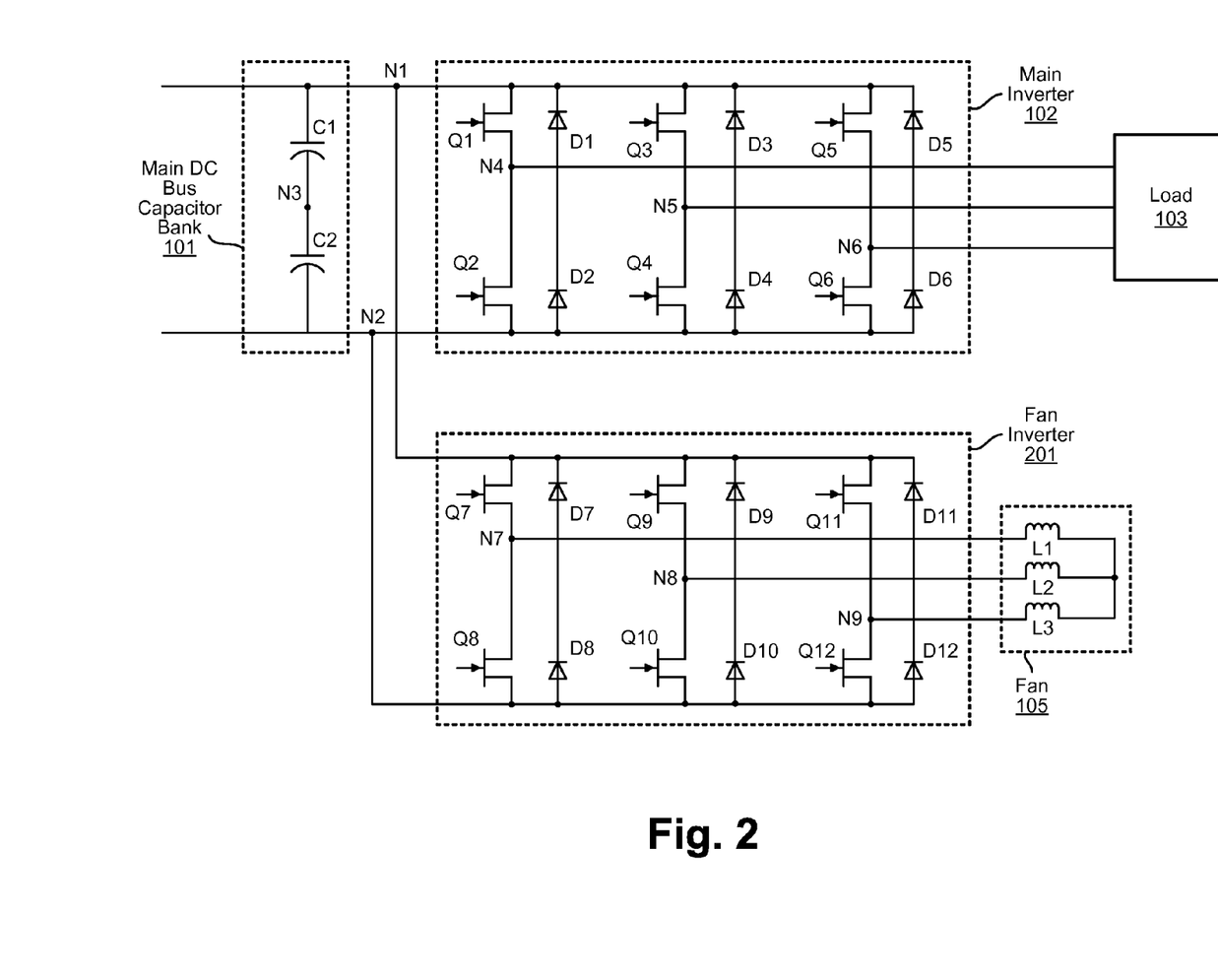
FIG. 2 is a schematic diagram of an example adjustable speed drive system having a multi-phase cooling fan, in accordance with aspects as described herein.

As mentioned above, the fan 105 may be a single-phase fan or it may be a multi-phase fan. FIG. 2 is an example schematic diagram in which the fan 105 is a three-phase fan. In this particular example, the fan 105 is shown to have three inductive motor coils L1, L2, and L3.

Rather than using an H-bridge converter as the fan drive circuit, this particular example uses a fan inverter 201 as the fan drive circuit. The fan inverter 201 may include IGBTs Q7-Q10, diodes D7-D10, and nodes N7 and N8 arranged as described previously with regard to FIG. 1, and may further include IGBTs Q11 and Q12, diodes D11 and D12, and electrical node N9 arranged as shown in FIG. 2. Each of the motor coils L1, L2, and L3 of the fan 105 may be coupled to a different one of nodes N7, N8, and N9.

Figure 3:
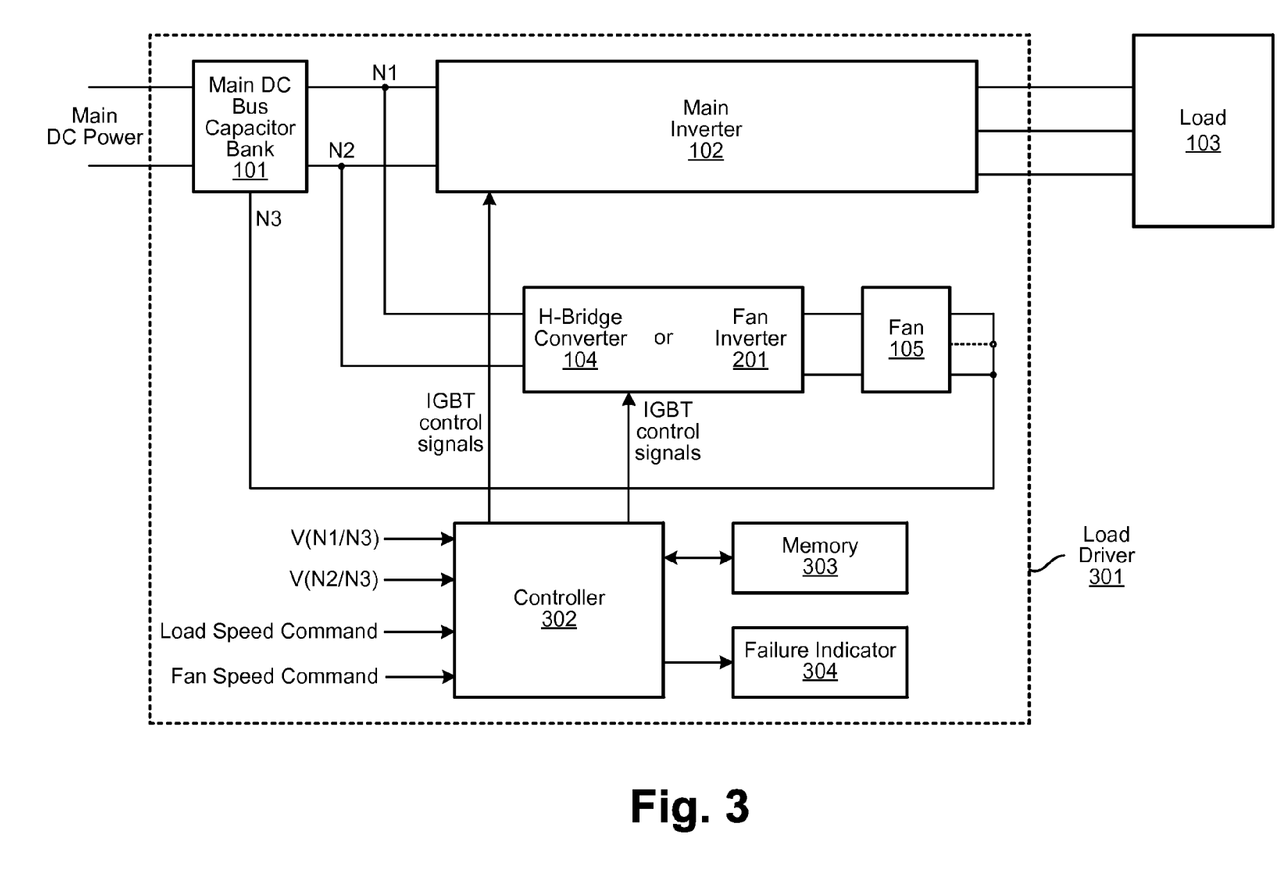
FIG. 3 is a block diagram of another example of an adjustable speed drive system, in accordance with aspects as described herein.

FIG. 3 is a block diagram of another example of an adjustable speed drive system. The adjustable speed drive system may be or otherwise include a load driver 301 that receives power such as main DC power, and that drives the load 103. The load driver 301 may include the main DC bus capacitor bank 101, the main inverter 102, the H-bridge 104 or the fan inverter 201 (which may depend upon whether the fan 105 is a single-phase fan or a multi-phase fan), the fan 105, a controller 302, memory 303 (and/or other data storage), and a failure indicator 304. The load driver 301 may be integrated as a single physical unit in a single housing that at least partially encloses any or all of elements 101, 102, 104, 201, 105, 302, 303, and 304, and may include electrical connectors for coupling to the main DC power and/or to the load 103. The load driver 301 may also have one or more user interface elements for receiving human user input and/or providing information to a human user (e.g., a display, a speaker, etc.), and/or the load driver 301 may have a data port for communicating with one or more other devices (such as one or more computers, one or more other load drivers, and/or one or more sensors) that are external to the load driver 301.

The controller 302 may be or otherwise include, for example, a processor (such as a microprocessor or central processing unit) that may be configured to perform particular functions and/or general functions as desired, along with any other supporting circuitry as desired. The controller 302 may include and/or be coupled to the memory 303 (and/or other one or more types of computer-readable storage media) for storing computer-executable instructions that, when executed by the controller 302, cause the controller 302 to perform any of the functionality attributed herein to the controller 302. Additionally or alternatively, the controller 302 may be hardwired to perform some or all of the functionality attributed herein to the controller 302. The memory 303 may be physically separate from the controller 302, it may be physically part of the controller 302 (e.g., cache on a microprocessor chip), or it may be distributed such that it is both external to and part of the controller 302.

While the controller 302 may have many other functions, the controller 302 may be responsible for generating the driving signals for the IGBTs of the main inverter 102 and the H-bridge converter 104 (or the fan inverter 201) to cause the load 103 and the fan 105 to operate in a desired manner. The controller 302 may generate the driving signals for the IGBTs Q1-Q10 or Q1-Q12 (depending upon whether the H-bridge converter 104 or the fan inverter 201 is used) such that one or more characteristics of the driving signals may depend upon one or more other signals received by the controller 302. In this example, such signals received by the controller 302 (such as via one or more logical or physical ports) may include a signal V(N1/N3), a signal V(N2/N3), a Load Speed Command signal, and a Fan Speed Command signal. Other signals may additionally or alternatively be used. The signals received by the controller 302 may be analog or digital signals, as desired.

The signal V(N1/N3) in this example represents or is otherwise based on a measured voltage difference between nodes N1 and N3. The signal V(N2/N3) in this example represents or is otherwise based on a measured voltage difference between nodes N2 and N3. Thus, node N3 may be considered a floating ground relative to which the voltages at nodes N1 and N2 are measured. The signals V(N1/N3) and V(N2/N3) may be in any units and of any scale desired. For example, the signals V(N1/N3) and V(N2/N3) may vary linearly with their respective measured voltages. The voltages between nodes N1 and N3 and between N2 and N3 may be measured by one or more voltage measuring circuits. Various types of voltage measuring circuits are well-known to one of ordinary skill in the art and need not be described in detail herein.

The Load Speed Command signal may represent a commanded speed or other characteristic to be commanded of the load 103. For example, where the load 103 is a rotating load such as an electrical motor, the Load Speed Command may vary linearly with a commanded rotational speed of the load 103. The Load Speed Command signal may be generated internally and automatically by the load driver 301, and/or the Load Speed Command signal may be controlled manually by a human user of the load driver 301, such as via a rotating speed dial or a keypad input.

The Fan Speed Command signal may represent a commanded speed or other characteristic to be commanded of the fan 105. The Load Speed Command may, for example, vary linearly with a commanded rotational speed of the fan 105. The Fan Speed Command signal may be generated internally and automatically by the load driver 301 (e.g., by the controller 302 or external to the controller 302), and/or the Fan Speed Command signal may be controlled manually by a human user of the load driver 301, such as via a rotating speed dial or a keypad input.

The controller 302 may further be coupled to the failure indicator 304. The failure indicator 304 may be configured to generate an output suitable for sensing by a human user (such as a light, a sound, a displayed message, etc.), and/or to generate output data suitable for interpretation by another device such as a computer external to the load driver 301. If the controller 302 determines that it is appropriate to indicate a warning or other type of failure indication to the human user and/or to the external device, then the controller 302 may send a signal to the failure indicator 304 to cause the failure indicator 304 to generate the appropriate output. For example, if the controller 302 determines that the load driver 301 is operating in a particular manner that is likely to result in imminent failure, then the controller 302 may cause the load driver 301 to flash a light, emit a sound, display a warning message, and/or send data representing a warning message to an external device. The warning message may be any type of message or other indication, such as an indication of imminent failure if a certain action is not taken, an indication that a particular one or more components of the load driver 301 (such as one or more of the capacitors of the main DC bus capacitor bank 101) should be replaced, or an indication that the load driver 301 is operating improperly or unexpectedly. As will be described, the controller 302 may make such determinations based on a comparison between the signals V(N1/N3) and V(N2/N3), and/or based on one or more predetermined threshold values that may be stored in, e.g., the memory 303. Any of thresholds discussed herein may be of zero or non-zero values.

Figure 4:
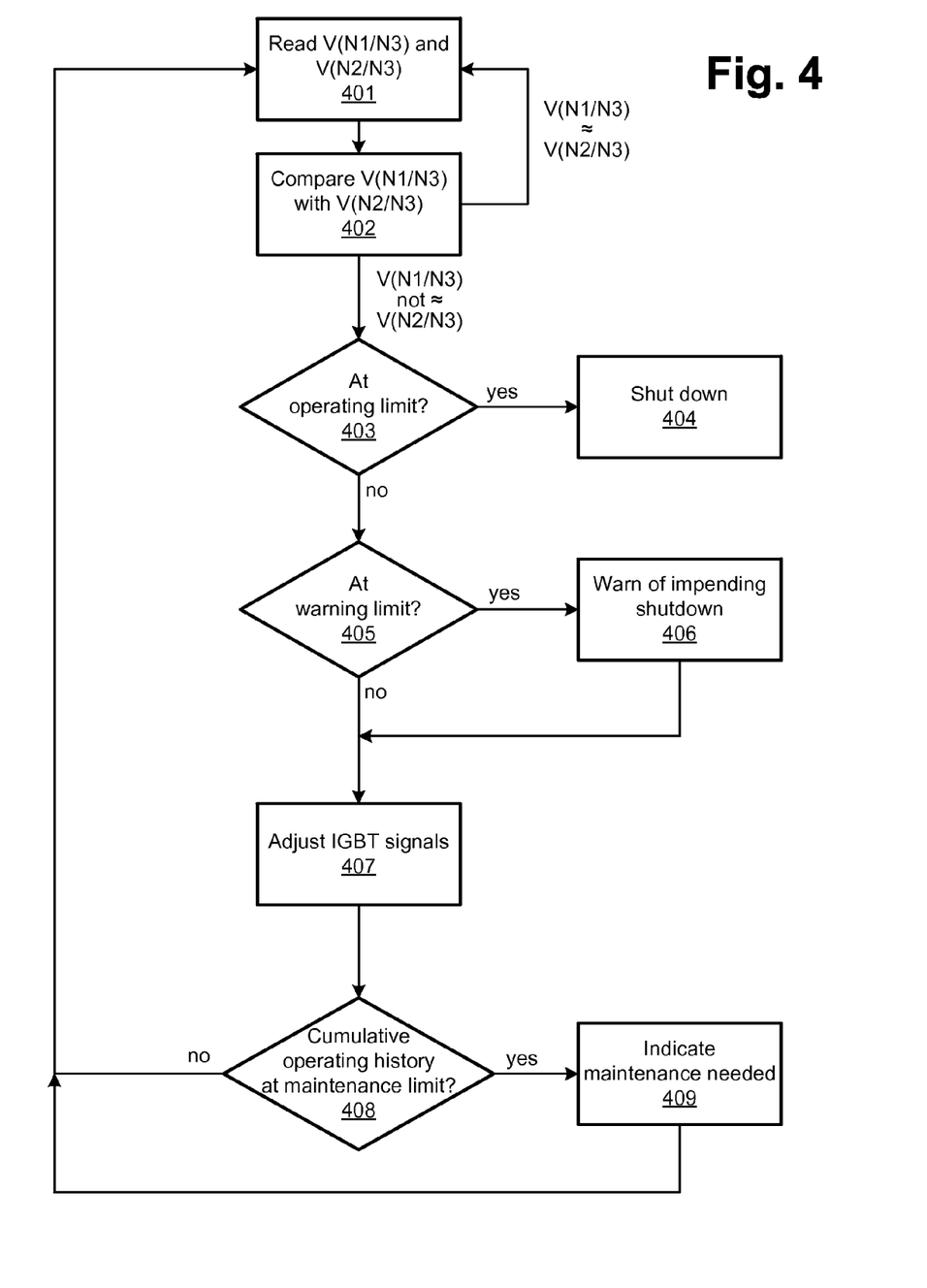
FIG. 4 is a flow chart of example steps that may be performed by an adjustable speed drive system, in accordance with aspects as described herein.

FIG. 4 is a flow chart of example steps that may be performed by an adjustable speed drive system such as the load driver 301 described in connection with FIG. 3. Any or all of the steps described in connection with FIG. 4 may be performed and/or controlled by, for instance, the controller 302. Any or all of the steps may also be represented by computer-executable instructions stored in a computer-readable storage medium such as the memory 303. In such a case, the controller 302 may retrieve and execute the stored computer-executable instructions to cause any or all of the steps of FIG. 4 to be performed. While certain elements of FIG. 3 are mentioned below with regard to certain steps of FIG. 4, it will be understood that other elements may perform the steps. It is also understood that some of the steps may be combined or further subdivided, performed in a different order, and/or performed in parallel.

At step 401, the controller 302 may read (e.g., sample) and/or otherwise receive the signals V(N1/N3) and V(N2/N3). As previously discussed, these signals may be generated by, e.g., one or more voltage measuring circuits coupled to nodes N1, N2, and N3. In this example, it will be assumed that V(N1/N3) varies linearly and proportionally with the measured voltage difference between nodes N1 and N3, and that V(N2/N3) varies linearly and proportionally with the measured voltage difference between nodes N2 and N3. For example, V(N1/N3) may be equal to X*|(N1 voltage−N3 voltage)|, where X is a positive constant, and similarly, V(N2/N3) may be equal to X*|(N2 voltage−N3 voltage)|. However, these signals may vary in other ways with their respective measured voltage differences, such as non-linearly and/or in a quantized (e.g., digital) manner. For instance, V(N1/N3) and V(N2/N3) may be presented to the controller 302 as N-bit (where N may equal, for instance, 8 or 16) binary values. In such a case, the voltage measuring circuitry may include an analog-to-digital converter for converting the measured voltages to the digital values. Alternatively to directly reading the signals V(N1/N3) and V(N2/N3), the controller 302 may read and/or otherwise receive an analog or digital signal based on the difference between the measured voltages. The difference may be determined by an element other than the controller 302, such as by the voltage measuring circuitry and/or by another element. In such a case, the analog-to-digital converter may convert the analog measured voltages to digital signals as described above (in which case the difference would be determined digitally) or the analog-to-digital converter may convert the difference between the analog measured voltages to a digital signal.

At step 402, the controller 302 may compare V(N1/N3) and V(N2/N3), such as by taking the difference between the values represented by these signals and/or by determining which of the two signals has a greater value. Based on the comparison, the controller 302 may determine whether the values of V(N1/N3) and V(N2/N3) are approximately equal to each other, and if so, the process may return to step 401 to sample another set of values of V(N1/N3) and V(N2/N3). The controller 302 may determine that the two values are approximately equal by, for instance, determining whether the difference between the values is less than a predetermined threshold amount or percentage, or within a predetermined threshold range. For example, if it is determined that the difference in the values of V(N1/N3) and V(N2/N3) is less than P percent (where P may be a predetermined value such as between one and five percent) of the value of V(N1/N3) or V(N2/N3), then the controller may consider these two values to be approximately equal to each other. Or, for example, the controller 302 may determine that the values are approximately equal if their difference is less than a predetermined fixed value. In either case, the controller 302 may further determine that the two values are approximately equal if their difference is within a range of −P percent to +P percent, or − fixed value to + fixed value. Alternatively, the absolute value of the difference may be determined and compared to only the positive threshold value. Any thresholds referred to herein may be predetermined and stored, such as by being represented by data that is stored in the memory 303.

Based on the comparison, the controller 302 may also determine whether the value of V(N1/N3) is sufficiently greater than the value of V(N2/N3), or vice versa. The controller 302 may determine that one of these two situations is true if, for instance, the controller 302 does not determine that the two values are approximately equal to each other. In such as case, if the difference in the two values is greater than the threshold (our outside the threshold range), then one of the two values is sufficiently greater than the other. If the controller 302 determines that the difference in the values of V(N2/N3) is sufficiently high (e.g., exceeds the threshold or is outside the threshold range), then the process may move to step 403.

At step 403, the controller 302 may determine whether the difference in the values of V(N1/N3) and V(N2/N3) is sufficiently large to meet or exceed a predetermined operating limit threshold (which may be stored in, e.g., the memory 303). A high difference between the values of V(1/N3) and V(N2/N3) may indicate that the system is unable to adequately compensate for a shifting of the voltage at node N3. This may be due to, for instance, one of the capacitors C1 or C2 failing or beginning to fail. The operating limit threshold thus may be set to be a value at which the difference is considered to be unacceptably high under such circumstances. If the controller 302 compares the difference in the values of V(N1/N3) and V(N2/N3) with the operating limit threshold, and determines the difference is at or exceeds the operating limit threshold, then the controller 302 may perform step 404 and cause the load driver 301 to perform an at least partial emergency shut down. For example, the controller 302 may abruptly or gradually adjust the IGBT control signals to the main inverter 102 and/or to the H-bridge converter 104 (or the fan inverter 201) to cause the current to the load 103 and/or the fan 105 to abruptly or gradually reduce or even stop. The controller 302 may further cause (e.g., by switching a relay) the main DC bus capacitor bank 101 to be isolated from the main DC power. By shutting down the driving of the load 103 and/or the fan 105, this may prevent damage to the load 103 and/or the load driver 301. For example, if one of the capacitors C1, C2 of the main DC bus capacitor bank 101 fails, this may cause a voltage overload on the other one of the capacitors C1, C2, thereby causing the other capacitor to quickly fail. Where the capacitors C1 and C2 are relatively large high-voltage capacitors, they may be expensive to replace, and so preventing failure of both capacitors rather than only one capacitor may reduce any replacement and labor costs that may be associated with the failure.

The controller 302 shutting down the load driver 30 may further prevent causing a fuse (if any) for the main DC power or elsewhere to go into an open state. This may be desirable especially where the fuse may be difficult and/or expensive to replace. Moreover, depending upon the controller 302 and the load driver 301, the controller 302 may be able to shut down the load driver 301 faster than a conventional fuse would be able to. This may be especially true where the controller 302 is configured to perform the steps of FIG. 4 at a high cycle rate, such as by sampling and analyzing V(N1/N3) and V(N2/N3) at a high frequency.

If the operating limit is not met or exceeded at step 403, then at step 405 the controller may determine whether the difference in the values of V(N1/N3) and V(N2/N3) is sufficiently large to meet or exceed a predetermined warning limit threshold (which may also be stored in, e.g., the memory 303). Step 405 may be performed at other points in the process, such as prior to or simultaneously with step 403. The warning limit threshold may be lower than the operating limit threshold. If the warning limit threshold is met or exceeded as determined by the controller 302, then the controller 302 may perform step 406, which may involve causing a warning to be provided to a human user and/or another device. For example, the controller 302 may cause a warning message to be displayed, sounded, or otherwise provided by the failure indicator 304. Additionally or alternatively, the controller 302 or the failure indicator 304 may send data indicating a warning to another device external to or part of the load driver 301. The warning indication and/or data may be used by the human user and/or another device to take certain protective actions (e.g., proactive maintenance such as by replacing one of the capacitors C1 or C2) and/or to otherwise prepare for potential impending failure of the load driver 301 (such as by switching over to a backup load driver and shutting down the load driver 301 in a controlled manner).

In addition to or instead of providing a warning, the controller 302 may, at step 406, alter the way that the load driver 301 operates. For example, the controller 302 may adjust the IGBT control signals to the main inverter 102 and/or the H-bridge converter 104 (or the fan inverter 201) in a manner that may be intended to prevent deterioration of system control to the level of the operating limit threshold. As another example, where a standby backup capacitor may be provided as a hot standby backup to one of the capacitors C1 and C2, the controller 302 may cause the standby backup capacitor to be utilized rather than the one of the capacitors C1, C2 that is likely beginning to fail. This latter action of invoking a standby capacitor may alternatively be taken at step 404 rather than shutting down the load driver 301. As a further example, the controller 302 may adjust the IGBT control signals to the H-bridge converter 104 or the fan inverter 201 to increase the speed of the fan 105 in an effort to increase cooling of the capacitors C1, C2 and/or other elements in the load driver 301, which may slow the deterioration of those elements.

Assuming that neither the operating limit nor the warning limit is met or exceeded, then the process may move to step 407. At step 407, the controller 302 may adjust the IGBT control signals that feed into the gates of the IGBTs of the H-bridge converter 104 (or the fan inverter 201) such that the average drive currents provided to the L1, L2, and/or L3 branches of the fan 105 are changed. The controller 302 may do this by, for instance, changing the PWM patterns of the IGBT control signals, such as by modifying the widths and/or timing of the pulses in the PWM signals. The IGBT control signals may be adjusted in order to adjust the Y-point voltage where the branches of the fan 105 are coupled together (i.e., node N3) toward a voltage that would better equalize the voltages between nodes N1 and N3 and between nodes N2 and N3. In other words, the controller 302 may adjust the IGBT control signals such that the voltage at N3 changes in a way that would either cause the values of V(N1/N3) and V(N2/N3) to be approximately equal to each other, or would at least cause the two values to become closer together (reduce their difference). The controller 302 may adjust the IGBT control signals such that the various phases of the fan 105 are out of balance—that is, the timing and/or power provided to the fan 105 may be unequal among the phases L1 and L2 (and/or L3) of the fan 105. This unequal control of the various fan phases may, for example, allow for excess power to dissipate in an active way as compared with the traditional use of dissipating voltage divider resistors. The difference between V(N1/N3) and V(N2/N3) may be reduced by an amount less than necessary to cause the difference to be less than the threshold value (or within the threshold range) if, for instance, there is a concern that an abrupt large change in the drive currents to the fan 105 would be undesirable. However, such an abrupt change may be made if that is desired. While step 407 is shown to occur after step 405, step 407 may be performed in a different order, such as prior to performing steps 403 and/or 405.

At step 408, the controller 302 may store the values of V(N1/N3) and V(N2/N3), and/or other values such as the difference thereof, to accumulate a history of the operation of the load driver 301. The history may be stored, for example, as data in the memory 303. The controller 302 may further analyze the stored history data to find trends in the data. It may be expected that the capacitors C1 and/or C2 will deteriorate with usage over time. However, a deterioration rate that is higher than expected may provide useful information. For example, the controller 302 may determine that there is a general trend for the difference between V(N1/N3) and V(N2/N3) to increase more quickly over time than expected. If that is the case, then the controller 302 may cause a warning message and/or data at step 409 to be presented by, e.g., the failure indicator 304, even though the warning limit threshold has not yet been reached as determined at step 405. The warning message in this case may be a different warning message, such as a pre-warning message or a maintenance reminder. In this way, the controller 302 may actually be able to predict failure of the capacitors C1, C2 at an earlier time and allow one or both the capacitors C1, C2 to be replaced at a convenient time rather than during the likely short period of imminent failure.

If the determination at step 408 is negative (no warning needed) or if the warning is provided at step 409, then the process may return back to step 401, new values of V(N1/N3) and V(N2/N3) may be read, and the process cycle repeated. This process cycle may be repeated during the entire operation of the load driver 301, if desired.

Thus, various examples of an improved load drive system and method of operation thereof have been described. While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications.

The invention claimed is:

1. An apparatus, comprising:
   an inverter circuit configured to drive a multi-phase electrical load, the inverter configured to be powered by first and second direct-current (DC) bus lines;
   a fan drive circuit configured to be powered by the first and second DC bus lines;
   a fan configured to be controlled by the fan drive circuit and having a plurality of windings coupled together at an electrical node;
   a first capacitor having a first terminal coupled to the first DC bus line and a second terminal coupled to the electrical node; and
   a second capacitor having a first terminal coupled to the second DC bus lines and a second terminal coupled to the electrical node.

2. The apparatus of claim 1, wherein the fan drive circuit comprises an H-bridge circuit.

3. The apparatus of claim 1, wherein the fan drive circuit comprises an inverter circuit.

4. The apparatus of claim 1, further comprising a controller configured to control the fan drive circuit based on a first voltage between the first DC bus line and the electrical node and based on a second voltage between the second DC bus line and the electrical node.

5. The apparatus of claim 4, further comprising a user interface, wherein the controller is further configured to cause the user interface to generate a message to a human user responsive to a difference between the first and second voltages exceeding a threshold.

6. The apparatus of claim 4, wherein the controller is further configured to control the inverter circuit to stop driving the load responsive to a difference between the first and second voltages exceeding a threshold.

7. The apparatus of claim 4, further comprising a user interface and a memory, wherein the controller is further configured to:
  store in the memory data representing an operational history, the operational history being based on a difference between the first and second voltages at various past times; and
  cause the user interface to generate a message to a human user based on the operational history.

8. The apparatus of claim 1, wherein the fan drive circuit comprises a plurality of transistors, the apparatus further comprising a controller configured to provide control signals to gates of the plurality of transistors based on a first voltage between the first DC bus line and the electrical node and based on a second voltage between the second DC bus line and the electrical node.

9. The apparatus of claim 8, wherein each of the plurality of transistors is an insulated gate bipolar transistor.

10. An apparatus, comprising:
  a plurality of insulated gate bipolar transistors (IGBTs) each having a collector/emitter path electrically extending between first and second electrical nodes;
  a fan configured to be controlled by the plurality of IGBTs and having a plurality of windings electrically coupled together at a third electrical node;
  a first capacitor having a first terminal coupled to the first electrical node and a second terminal coupled to the third electrical node;
  a second capacitor having a first terminal coupled to the second electrical node and a second terminal coupled to the third electrical node; and
  a controller configured to control the IGBTs based on a first voltage between the first and third electrical nodes and based on a second voltage between the second and third electrical nodes.

11. The apparatus of claim 10, wherein the plurality of IGBTs are configured as part of an H-bridge circuit.

12. The apparatus of claim 10, wherein the controller is configured to control the IGBTs based on a difference between the first and second voltages.

13. The apparatus of claim 10, wherein the controller is configured to provide pulse-width modulated signals to gates of the IGBTs, to compare a threshold with a difference between the first and second voltages, and to adjust at least one of the pulse-width modulated signals responsive to determining that the difference is greater than the threshold.

14. The apparatus of claim 10, further comprising a user interface, wherein the controller is further configured to cause the user interface to generate a message to a human user responsive to a difference between the first and second voltages exceeding a threshold.

15. The apparatus of claim 10, further comprising an inverter circuit configured to drive a multi-phase load, wherein the controller is further configured to control the inverter circuit to stop driving the load responsive to a difference between the first and second voltages exceeding a threshold.

16. An apparatus, comprising:
  an inverter circuit configured to drive a multi-phase electrical load, the inverter configured to be powered by first and second direct-current (DC) bus lines;
  a fan drive circuit configured to be powered by the first and second DC bus lines;
  a fan configured to be controlled by the fan drive circuit and having a plurality of windings coupled together at an electrical node; and
  a controller configured to selectively control the fan drive circuit based upon a measured voltage of the electrical node relative to the first and second DC bus lines.

17. The apparatus of claim 16, further comprising:
  a first capacitor electrically coupled between the first DC bus line and the electrical node; and
  a second capacitor electrically coupled between the second DC bus lines and the electrical node.

18. The apparatus of claim 16, wherein the controller is configured to:
  compare a threshold with a difference between (1) a first voltage between the first DC bus line and the electrical node, and (2) a second voltage between the second DC bus line and the electrical node; and
  responsive to determining that the difference between the first and second voltages is greater than the threshold, control the fan drive circuit to adjust an operation of the fan.

19. The apparatus of claim 16, wherein the fan drive circuit comprises an H-bridge circuit.

20. The apparatus of claim 16, wherein the electrical node is a floating electrical node.

* * * * *